US006363581B1

United States Patent
Zipp

(10) Patent No.: US 6,363,581 B1
(45) Date of Patent: Apr. 2, 2002

(54) DISTRIBUTED FORCE HOSE CLAMP AND METHOD OF USE

(75) Inventor: Guy Anthony Zipp, Liverpool, NY (US)

(73) Assignee: JGB Enterprises, Inc., Liverpool, NY (US)

( * ) Notice: Subject to any disclaimer, the term of this patent is extended or adjusted under 35 U.S.C. 154(b) by 0 days.

(21) Appl. No.: 09/546,258

(22) Filed: Apr. 10, 2000

Related U.S. Application Data

(63) Continuation-in-part of application No. 09/427,290, filed on Oct. 26, 1999.

(51) Int. Cl.$^7$ ............................ F16L 33/00; B65D 63/00
(52) U.S. Cl. ............................ 24/19; 285/253; 285/318; 24/284
(58) Field of Search .................... 24/19, 16 R, 274, 24/284, 287; 285/252, 253, 148.23, 148.26

(56) References Cited

U.S. PATENT DOCUMENTS

| | | | |
|---|---|---|---|
| 455,967 A | | 7/1891 | Lusk et al. |
| 473,537 A | * | 4/1892 | Weidaw ..................... 24/284 |
| 609,488 A | * | 8/1898 | Wood ......................... 285/253 |
| 1,303,098 A | | 5/1919 | Merz |
| 1,539,001 A | * | 5/1925 | Steeple ...................... 285/253 |
| 4,093,282 A | * | 6/1978 | Kyriakodis ............. 285/253 X |
| 4,738,475 A | | 4/1988 | Ebert ......................... 285/174 |
| 5,018,768 A | * | 5/1991 | Palatchy .................... 285/420 |
| 5,306,051 A | * | 4/1994 | Loker et al. ............ 285/253 X |

* cited by examiner

Primary Examiner—Robert J. Sandy
(74) Attorney, Agent, or Firm—Hayes, Soloway, Hennessey, Grossman & Hage, PC

(57) ABSTRACT

A hose clamp is provided for establishing a reliable, fluid-tight, seal between a hose and a receptacle therefore or to another length of hose. The clamp includes a plurality of clamp segments and a span ring, e.g., a spiral wound ring. Each clamp segment includes an arcuate interior surface having a span ring slot therein which is positioned to align with a corresponding span ring slot in an adjacent clamp segment. The span ring has a portion disposed in each span ring slot with the interior surface the span ring approximately flush with the interior surfaces of the segments. Each clamp segment further includes a bore on a first end thereof which is adapted to align with a corresponding bore on an end of an adjacent segment. A fastener, e.g., a screw, may be inserted into the bores to draw the ends of the clamp segments toward each other, thereby tightening the segments of the clamp around the hose and receptacle. As the clamp tightens around the hose, the diameter of the span ring changes so that the top surface of the span ring remains approximately flush with the interior surfaces of the clamp segments. The clamp provide an evenly distributed compression force against the hose, and may flex to maximize contact between the clamp and the hose. Spaces between the clamp segments are spanned by the span ring, which provides a localized compression force against the hose in the areas of the spaces.

9 Claims, 4 Drawing Sheets

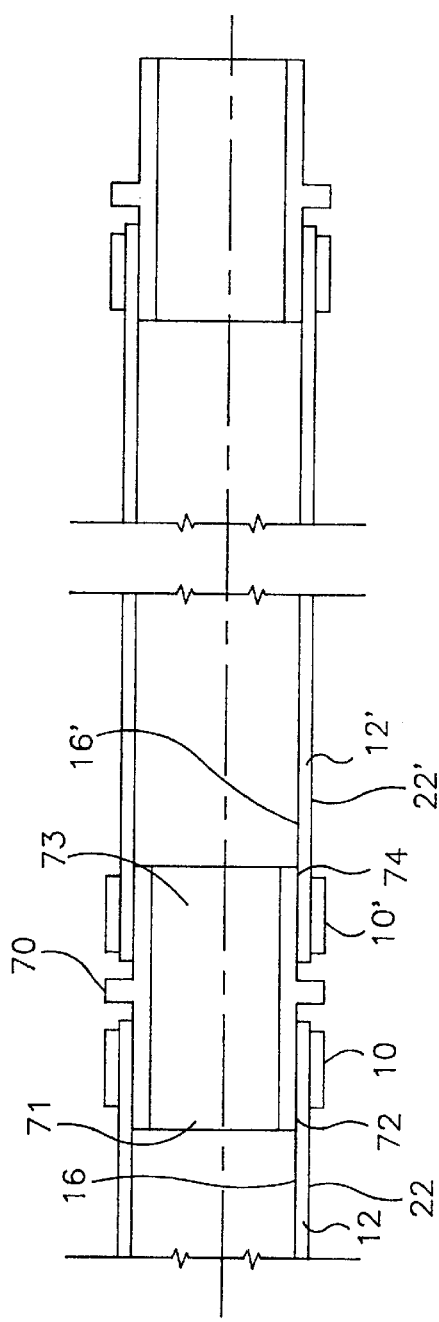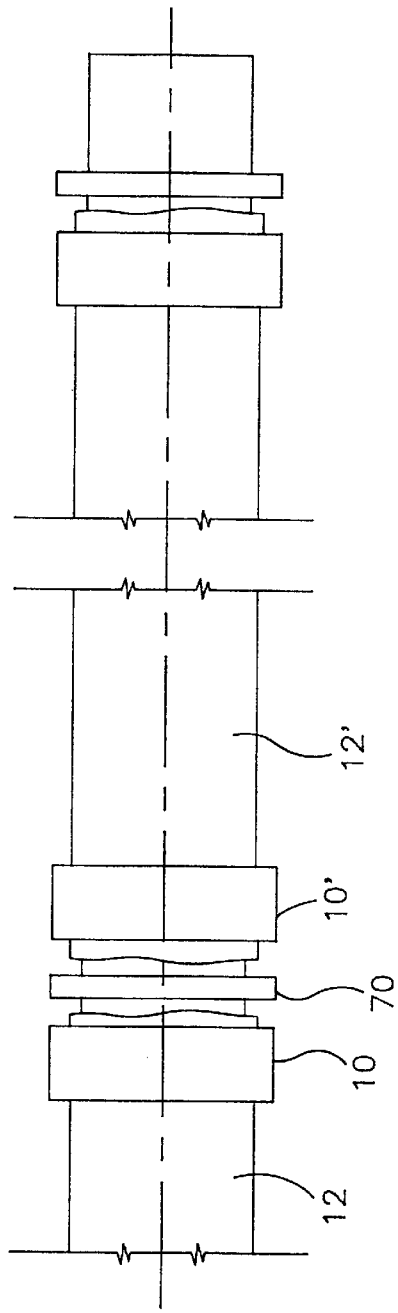
FIG. 5
FIG. 6

DISTRIBUTED FORCE HOSE CLAMP AND METHOD OF USE

CROSS REFERENCE TO RELATED APPLICATION

The present application is a continuation-in-part of co-pending U.S. application Ser. No. 09/427,290, filed Oct. 26, 1999, the teachings of which are incorporated herein by this reference.

FIELD OF THE INVENTION

The present invention relates in general to a hose clamp, and, more particularly to a hose clamp for coupling a flexible hose, or the like, to a receptacle therefore or to another length of hose.

BACKGROUND OF THE INVENTION

Hose clamps are commonly used for the purpose of coupling a length of a flexible hose, or the like, to a receptacle in fluid communication with, for example, another length of hose or a fluid container. In general, conventional hose clamps, e.g., band clamps or segmented clamps, provide a compression force that deforms the compliant hose material against the exterior surface of the receptacle to establish a seal therebetween. Hose coupling devices, particularly those employing conventional hose clamps are well known in the art. For most applications wherein fluid, i.e. a gas or liquid, is provided under a relatively low pressure through the hose, the seal established between the hose and receptacle by a conventional clamp is sufficient to prevent leakage or unintended separation of the hose from the receptacle.

It has been recognized, however, that conventional hose clamps are inadequate for use in high-pressure fluid applications requiring, for example, a 150 p.s.i. working pressure and 600 p.s.i. burst pressure on a 6" diameter hose. Conventional band clamps generally exhibit insufficient clamping force for high-pressure applications. Segmented clamps generally provide a high clamping force, but are deficient in other aspects.

For example, one reason for the failure of conventional segmented hose clamps in these applications is that they generally fail to provide an even distribution of compression force against the exterior surface of the hose. Typically, segmented hose clamps are generally annular in form with one or more ridges or compression rings on the interior surface of the clamp. The hose is positioned with its interior surface against the exterior surface of the receptacle, and the clamp is tightened around the hose with the ridges or compression rings providing or adding to the compression force against the hose. The hose is thereby deformed against the exterior surface of the receptacle, which may have indentations or ridges therein in areas that correspond with the ridges or compression rings on the interior surface of the clamp.

Unfortunately, the ridges or compression rings on the clamp provide a localized compression force against the hose. In low-pressure applications, this localized force is sufficient for maintaining a seal between the hose and the receptacle. However, in high-pressure applications, the forces created by the fluid passing through the hose and into the receptacle can overcome the localized compression force and dislodge the hose and clamp from the receptacle. This can result in undesired spilling of the fluid, which, depending on the nature of the fluid can create a potentially dangerous situation. Also, as the clamp is dislodged from hose, the clamp may be projected at a high velocity in the direction of fluid flow, potentially resulting in property damage and/or severe physical injury.

Another aspect of conventional segmented clamps that attributes to their lack of utility in high-pressure applications is their lack of adaptability to account for tolerance variations in hose and receptacle diameter. Typically, a segmented hose clamp is configured for clamping a hose having a pre-determined outside diameter to a receptacle having a predetermined outside diameter. When the hose and receptacle do not match their predetermined diameters due to manufacturing tolerances, the clamp may be slightly oversized or undersized. This results in an uneven distribution of the compression force against the hose that can precipitate leakage or unintended separation of the hose from the receptacle under high fluid pressure. Again, the rupture and the spillage associated therewith can result in physical injury and property damage.

Accordingly, there is a need in the art for a hose clamp that may be utilized to efficiently and reliably secure a flexible hose or the like to a receptacle or to another hose when fluid is passed through the hose under high pressure.

SUMMARY OF THE INVENTION

The present invention is organized about the concept of providing a hose clamp that establishes a reliable, fluid-tight, seal between a hose and a receptacle or another length of hose in relatively high-pressure fluid applications, e.g. 150 psi working pressure. A clamp consistent with the invention provides distributed compression force on a hose using a plurality of clamp segments and a span ring, e.g., a spiral wound ring. Each clamp segment includes an arcuate interior surface having a span ring slot therein positioned to align with a corresponding span ring slot in an adjacent clamp segment. Each clamp segment further includes a bore in a first end thereof which is adapted to align with a corresponding bore in an end of an adjacent segment.

Upon installation, the hose is positioned over a receptacle, and the clamp segments are oriented around the hose with the span ring disposed in the respective span ring slots. A fastener, e.g., a screw, may be inserted into the bores to draw the ends of the clamp segments toward each other, thereby tightening the segments of the clamp around the hose and receptacle. As the clamp tightens around the hose, the diameter of the span ring changes so that the top surface of the span ring is approximately flush with the interior surfaces of the clamp segments. Thus, in contrast to the prior art wherein a localized compression force is established by ridges or compression rings on the interior surface of the clamp, in a clamp consistent with the present invention a distributed compression force is established primarily by the pressing engagement of the interior surfaces of the clamp segments against the hose.

Advantageously, the clamp segments are dimensioned relative to the expected diameter of the hose so that when the clamp is installed, a space is provided between the ends of the clamp segments. This arrangement facilitates compensation for variations in the expected diameter of the hose and receptacle due to manufacturing tolerances. As the clamp is tightened around the hose, the independence of the clamp segments relative to each other allows the clamp segments to flex slightly to conform to the exterior surface of the hose. The span ring extends across the spans between the clamp segments to maintain compression in the areas of the spans.

More particularly, a distributed force hose clamp consistent with the invention includes a plurality, e.g. three, of separate clamp segments, each of which has an interior surface with a span ring slot therein. Each of the clamp segments may be constructed of aluminum, and may be generally arcuate with a generally rectangular cross-section having chamfered top edges. The interior surfaces of the clamp segments may define a portion of an arc approximately equal to 360° divided by a total number of clamp segments.

A clamp consistent with the invention further includes a spiral-wound span ring having separate portions disposed in each of the span ring slots with an interior edge of the span ring approximately flush with an interior surface of each of said clamp segments. The span ring has at least one portion spanning at least one space between adjacent ones of the clamp segments.

The segments may be joined around a hose in a variety of manners to create a compression force between the interior surfaces of the segments and the hose. According to one exemplary embodiment, however, each of the clamp segments has a first end with a first fastener bore therein and a second end with a second fastener bore therein. The segments may be joined using fasteners, e.g., screws. Each fastener may have a portion disposed in one of the first fastener bores and a second portion extending into one of the second fastener bores for releasably joining the clamp segments in an end-to-end configuration.

A method coupling a hose to a receptacle consistent with the invention includes the steps of: providing a hose clamp consistent with the invention, positioning the span ring and the clamp segments over the hose with the hose disposed between the interior surfaces of the clamp segments and said receptacle; and placing the interior surfaces in compression against the hose to compress the hose against the receptacle. The interior surface may be placed into compression against the hose by threading fasteners into respective first and second fastener bores of adjacent clamp segments.

Coupling one hose to another hose consistent with the invention includes the steps of: providing a first hose clamp consistent with the invention, positioning the span ring and the clamp segments of the first hose clamp over the first hose with the hose disposed between the interior surfaces of the clamp segments and one end of a hose coupling device dimensioned relative the diameter of the hose; and placing the interior surfaces of the first hose clamp in compression against the first hose to compress the first hose against the hose coupling device. These steps are repeated for the second hose using a second hose clamp to compress the second hose against the other end of the hose coupling device. The hose coupling device may be constructed of plastic or metal, or other material of sufficient strength to withstand the distributed compression force of the invented clamp. Not only can hoses of the same diameter be coupled in this fashion, the invented clamp can be used to join hoses having different diameters by using a hose coupling device having different diameters at either end to accommodate the respective diameters of the hoses to be joined.

BRIEF DESCRIPTION OF THE DRAWING

For a better understanding of the present invention, together with other objects, features and advantages, reference should be made to the following detailed description which should be read in conjunction with the following figures wherein like numerals represent like parts:

FIG. 5: is a cross-sectional view of hoses coupled by a hose coupling device and hose clamps consistent with the invention;

FIG. 6: is a side view of an exemplary configuration of a hose coupling device and hose clamps consistent with the invention.

DETAILED DESCRIPTION OF THE INVENTION

Figure 1:
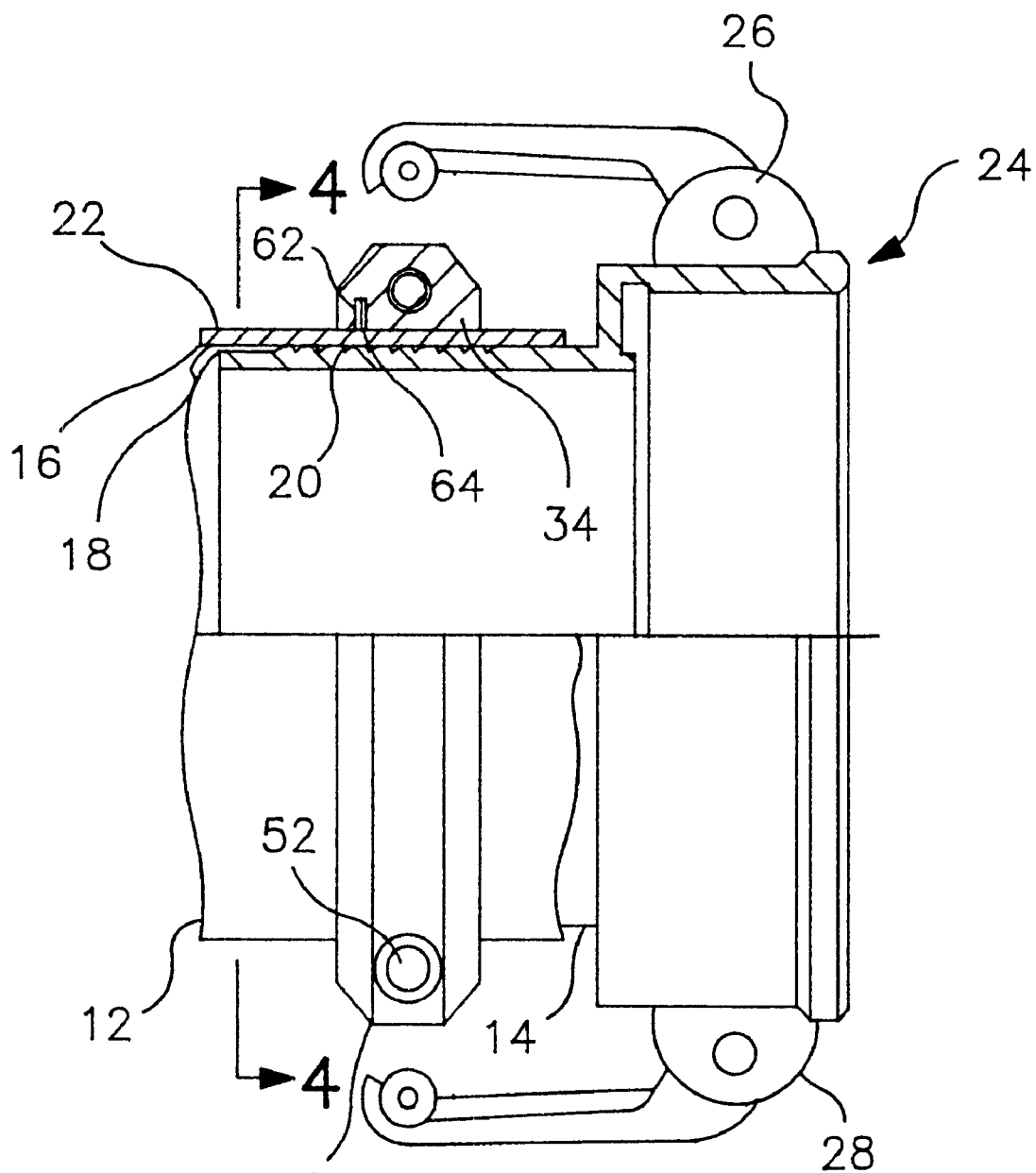
FIG. 1: is a side cut away view of an exemplary receptacle and hose coupled by an exemplary hose clamp consistent with the invention.

FIG. 1 illustrates an exemplary hose clamp 10 consistent with the invention disposed around a flexible hose 12 and a receptacle 14 for creating a fluid-tight seal between the hose and receptacle. Although in the illustrated embodiment a particular receptacle 14 is depicted, those skilled in the art will recognize that a hose clamp consistent with the invention may be utilized in connection with a wide variety of receptacle and hose types. It is to be understood, therefore, that the configuration in FIG. 1 is provided herein by way of illustration, but not of limitation.

In general, the hose 12 is dimensioned with an inside diameter which approximates the outside diameter of the receptacle 14 to which it is to be coupled. To join the hose to the receptacle, the hose is positioned over the receptacle with the interior surface 16 of the hose in contact with the exterior surface 18 of the receptacle. The exterior surface of the receptacle may, for example, include a plurality of circumferential ridges 20 for engaging the interior surface of the hose and resisting removal of the hose from the receptacle.

To couple the hose to the clamp, a hose clamp 10 consistent with the invention is positioned adjacent the exterior surface 22 of the hose with the hose positioned between the hose clamp 10 and the exterior surface 18 of the receptacle. The clamp is then tightened down around the exterior surface of the hose to compress the interior surface of the hose against the exterior surface of the receptacle. The compression force provided by the clamp establishes a fluid-tight seal between the hose and the receptacle, thereby allowing flow of fluid under high-pressure through the hose and the interior of the receptacle. The opposite end 24 of the receptacle may, for example, be removably secured to a fluid container (not shown) by locking arms 26,28 to provide fluid communication from the hose to the container through the receptacle.

Figure 2:
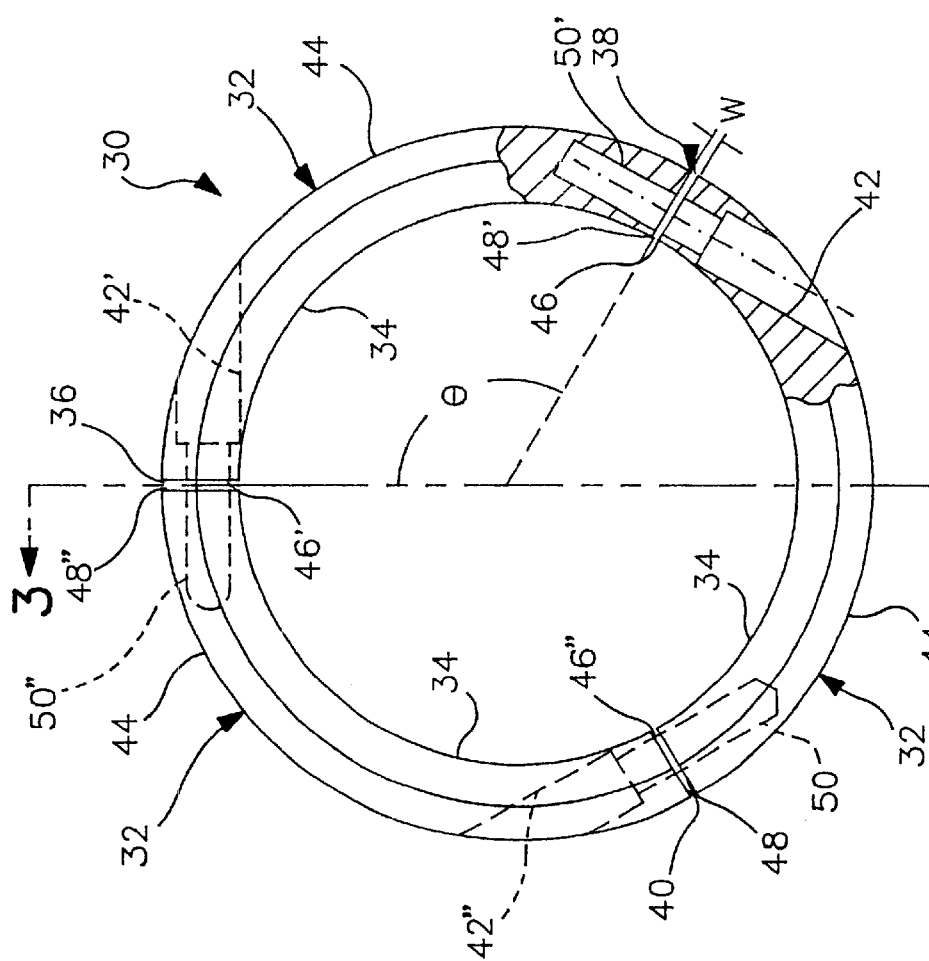
FIG. 2: is a front cut away view of an exemplary configuration of clamp segments for an exemplary hose clamp consistent with the invention.

Turning now to FIG. 2, an exemplary clamp consistent with the invention includes a plurality of clamp segments 32. Each clamp segment may be dimensioned with an interior surface 34 thereof forming an arc of a circle that is somewhat less than an arc θ equal to 360° divided by the number of separate clamp segments. For example, in the illustrated embodiment including three clamp segments, each claim segment is dimensioned to form an arc of a circle which is somewhat less than 120°, i.e. 360° divided by three. This allows for the provision of spaces 36, 38, 40 between ends of adjacent clamp segments when the segments are configured in an end-to-end arrangement to form a generally annular clamp body 30 for encircling a hose and receptacle.

As will be described in detail below, the spaces between the clamp segments allow for compression of the segments into the hose material and independent flexing of the segments to account for variations in hose and receptacle diameter attributable, for example, to manufacturing tolerances. Thus, the width w of the spaces may vary depending on the compliance of the hose material and the degree of flexing required for the clamp segments. It is advantageous, however, to minimize the spaces between the segments in order to maximize the distribution of the compression force provided by the clamp segments. For example, in one embodiment having three segments for coupling a six-inch hose to a receptacle, the segments may be configured to provide a clamp body having an inside diameter D (FIG. 3) of about 6.275" with spaces between the segments having width w of about 0.06".

The clamp segments may be joined around a hose in a variety of manners. In the illustrated embodiment, however, each segment 32 may include a first tangential bore, e.g., bores 42, 42', 42", extending through an exterior surface 44 thereof and intersecting a first end surface thereof, e.g. ends surfaces 46, 46', 46", respectively. A second threaded tangential bore, e.g., bores 50, 50', 50" may be provided in the second end surface of each segment, e.g. end surfaces 48, 48', and 48", respectively.

As shown, the first tangential bore of each segment, e.g., bore 42, aligns with a second tangential bore, e.g., bore 50' in an adjacent segment. Adjacent segments may by joined by threading a fastener, e.g. a screw 52 (FIG. 1), into each second threaded bore 50, 50', 50" with the head of the fastener disposed in the first tangential bore 42, 42', 42" of an adjacent segment. The meshing engagement of threads on the screw and the threads on the second threaded bores draws the segments together for tightening the segments around the exterior surface of the hose.

Figure 3:
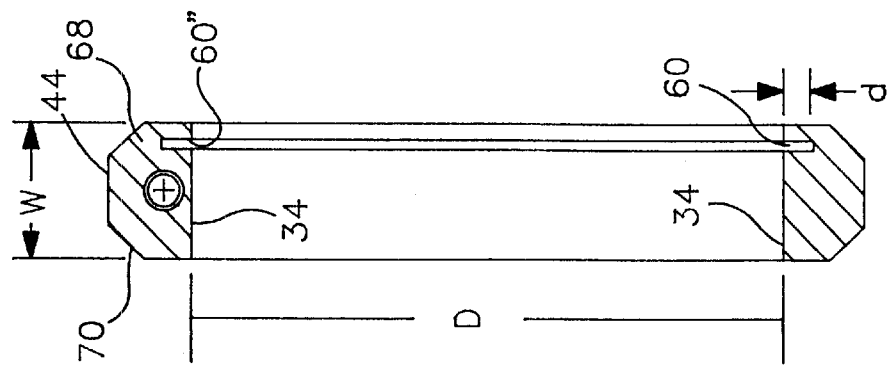
FIG. 3: is a sectional view of taken along lines 3—3 in FIG. 2.
Figure 4:
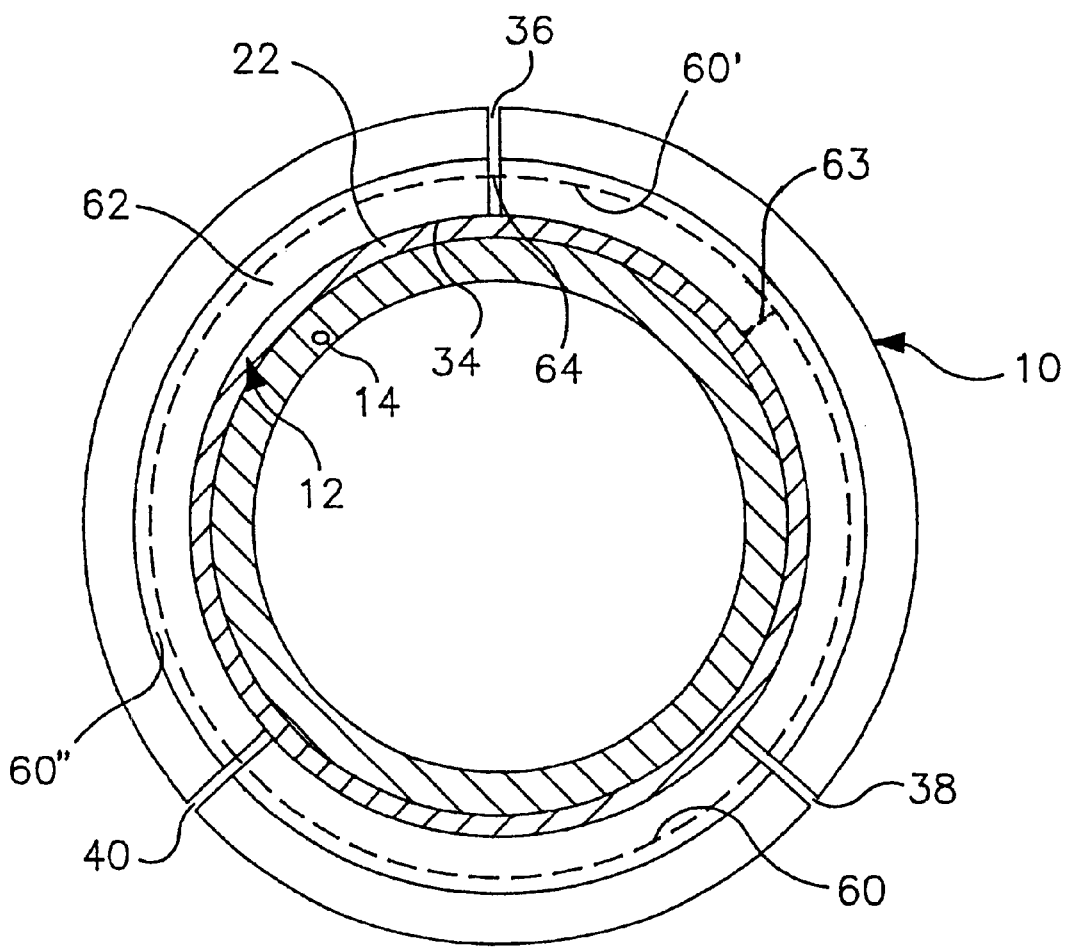
FIG. 4: is sectional view taken along lines 4—4 in FIG. 1.

With reference also to FIGS. 3 and 4, each segment 32 includes a span ring slot 60, 60', 60" in the interior surface 34 thereof for receiving a span ring 62. The span ring 62, as shown particularly in FIG. 4, is preferably a closed, spiral wound ring. Those skilled in the art will recognize that a spiral wound ring is generally constructed in an annular shape from spirally wound continuous length of material, and generally has two free ends, e.g. end 63 as shown in FIG. 4. Radial force on a spiral wound ring causes a change in the diameter of the ring in the direction of the applied force.

When the segments are configured in an end-to-end arrangement, as shown, the span ring slots 60, 60', 60" align for receiving the span ring 62 with a portion of the span ring disposed in each of the slots. The inside diameter of the span ring is chosen to correspond to the inside diameter D of the clamp body, and the depth d (FIG. 3) of the span ring slot in each segment substantially corresponds to the width of the span ring, i.e., the difference between the inside and outside diameter of the ring. Thus, with the span ring 62 disposed in the respective slots 60, 60', 60", the inside edge 64 of the ring is approximately flush with the inside surface 34 of each clamp segment.

The clamp segments may be formed from a variety of materials. In an exemplary embodiment, as shown in FIG. 3, the clamp segments 32 may be formed from aluminum stock with a generally rectangular cross section having chamfered top edges 68,70. It has been found that aluminum clamp segments with the illustrated cross section will flex slightly upon installation to account for variations in the expected diameter of the hose and receptacle. For example, in one exemplary embodiment wherein the three clamp segments provide a clamp body having an inside diameter of about 6.275" an outside diameter of about 8.0" and a width W of about 1.5", the segments 32 may flex inward about 0.018–0.022". Advantageously, this range of flexure may correspond to the manufacturing tolerance range for the hose and receptacle.

With continued reference to FIG. 4, a hose clamp 10 consistent with the invention may assembled for coupling a hose 12 to a receptacle 14. The clamp segments 32 and fasteners in bores 42, 42', 42" may be assembled to the span ring 62 prior to mounting on the hose. The clamp segments 34 may be positioned circumferentially around the span ring 62 with a portion of the span ring received within each of the span ring slots 60, 60', 60" in the clamp segments. The clamp may then be positioned over the hose, and hose may be positioned over the receptacle 14. With the hose positioned over the receptacle 14, the clamp segments 32 may be tightened down around the hose by turning fasteners in the bores 42, 42', 42" and threading them into the corresponding bores 50', 50", 50, respectively, in adjacent clamp segments.

As the clamp segments 34 are tightened down over the hose, a radially inward force is applied to the span ring 62 through the clamp segments, thereby reducing the diameter of the span ring and forcing the interior edge 64 of the span ring against the exterior surface 22 of the hose. Advantageously, however, the interior edge 64 of the span ring remains substantially flush with the interior surfaces 34 of the clamp segments, thereby allowing maximal contact between the interior surfaces 34 of the clamp segments and hose. This allows the clamp compression force to be distributed relatively evenly under the broad interior surfaces 34 of the clamp segments. In contrast to prior art hose clamps wherein a localized compression force is provided due to, for example, ridges on the interior clamp surface, the broadly distributed compression force provided in a hose clamp consistent with the invention provides a reliable seal in high-pressure fluid applications.

Moreover, the independent clamp segments 32 allow for accommodation of manufacturing tolerance variations in hose and receptacle dimensions by flexing around the hose and receptacle during installation. As the clamp segments are tightened down around the hose, the segments may independently flex to maintain maximal contact between the interior surfaces 34 of the segments and the hose. Thus, in the case where the expected diameter of the hose and receptacle varies due to manufacturing design tolerances, the fluid-tight seal is maintained.

Flexure of the clamp segments may cause an increase or decrease in the widths of one or more of the spaces 36, 38, 40 between the segments. In accordance with the invention, however, a compression force against the hose in the area of the spaces 36, 38, 40 is provided by the interior edge 64 of the span ring 62, which spans the spaces between the clamp segments. Thus, the interior surfaces 34 of the clamp segments provide a distributed compression force on the hose while localized compression force is provided in the spaces between the segments by the interior edge 64 of the span ring 62, which is forced against the hose by the clamp segments.

There is thus provided a hose clamp that establishes a reliable, fluid-tight, seal between a hose and a receptacle in relatively high-pressure fluid applications, e.g. 150 psi working pressure. The clamp provides a broadly distributed compression force against the hose in the areas where separate clamp segments pressingly engage the hose. The clamp segments may flex to conform to the exterior surface of the hose to maximize the contact surface between the hose and the clamp. A span ring having a portion disposed within a span ring slot in each clamp segment spans the spaces between the segments to provide a localized compression force in the areas of the spaces. Advantageously, in addition to providing a fluid-tight seal between the hose and the receptacle, the hose clamp has a minimal number of parts and may be easily assembled and disassembled using simple fasteners.

The present invention can also be used to couple a first hose to a second hose. Referring to FIGS. 5 and 6 is seen first hose clamp 10 disposed around first hose 12 and first end 71 of a conventional cylindrical hose coupling device 70 providing a fluid tight seal between the first hose and the hose coupling device. House coupling devices, such as the device 70, are well known to those skilled in the art, and are generally rigid relative to the hoses to be coupled. The outside diameter of first end 71 of hose coupling device 70 is dimensioned to approximate the inside diameter of first hose 12. To join the first hose 12 to hose coupling device 70, first hose 12 is positioned over and around end 71 of the coupling device, with the interior surface 16 of the first hose in contact with the exterior surface 72 of first end 71 of the hose coupling device. Hose clamp 10 consistent with the invention is positioned adjacent to and around the exterior surface 22 of the portion of first hose 12 positioned over end 71 of hose coupling device 70.

First hose clamp 10 is then tightened down around the exterior surface 22 of the first hose 12 to compress the interior surface 16 of the first hose against the exterior surface 72 of the first end 71 of cylindrical hose coupling device 70. The compression force provided by the first clamp establishes a fluid-tight seal between the first hose and the hose coupling device, thereby allowing flow of fluid under high-pressure through the hose and the interior of the coupling device. To provide fluid communication from the first hose 12 to the second hose 12' through the hose coupling device 70, these steps are repeated with second hose 10' tightened around the exterior surface 22' of second hose 12' compressing the interior surface 16' of the second hose against the exterior surface 74 of the second or opposite end 73 of the hose coupling device, the outside diameter of second end 73 of the coupling device being dimensioned to approximate the inside diameter of the second hose.

As will be recognized by those skilled in the art, the cylindrical hose coupling device 70 may be constructed of plastic or metal, or other material of sufficient strength to withstand the distributed compression force of the invented clamp while permitting fluids to pass through. Further, not only can hoses of the same diameter be coupled in this fashion, the invented clamp can be used to join hoses having different diameters by using a hose coupling device having different diameters at either end to accommodate the respective diameters of the hoses to be joined.

The embodiments described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. A method of coupling a first hose to a second hose comprising:

providing a first hose clamp comprising, a plurality of separate clamp segments, each of said clamp segments having an interior surface with a span ring slot therein, and a spiral-wound span ring, said span ring having portions disposed in each of said span ring slots with an interior edge of said span ring approximately flush with an interior surface of each of said clamp segments to facilitate a maximum pressing engagement of said interior surface of each said clamp segment with respect to engagement with said span ring against said hose for sealing said hose against said receptacle, thereby avoiding a localized compression force against said hose, said span ring having at least one portion spanning at least one space between adjacent ones of said clamp segments, positioning said span ring and said clamp segments of said first clamp over said first hose with said hose disposed between said interior surfaces of said clamp segments, said span ring, and a first portion of a hose coupling device;

placing said interior surfaces of said first clamp in compression around said first hose to compress said hose against said first portion of the hose coupling device; and providing a second hose clamp comprising, a plurality of separate clamp segments, each of said clamp segments having an interior surface with a span ring slot therein, and a spiral-wound span ring, said span ring having portions disposed in each of said span ring slots with an interior edge of said span ring approximately flush with an interior surface of each of said clamp segments to facilitate a maximum pressing engagement of said interior surface of each said clamp segment with respect to engagement with said span ring against said second hose for sealing said second hose against said receptacle, thereby avoiding a localized compression force against said second hose, said span ring having at least one portion spanning at least one space between adjacent ones of said clamp segments, positioning said span ring and said clamp segments of said second clamp over said second hose with said second hose disposed between said interior surfaces of said clamp segments, said span ring, and a second portion of said hose coupling device;

placing said interior surfaces of said second clamp in compression around said second hose to compress said second hose against said second portion of the hose coupling device.

2. A method according to claim 1, wherein said first hose and said second hose are of the same diameter.

3. A method according to claim 1, wherein said interior surface of each clamp segment of at least one clamp comprises a portion of an arc approximately equal to 360° divided by a total number of said plurality of clamp segments.

4. A method according to claim 1, wherein the hose coupling device is constructed of plastic.

5. A method according to claim 1, wherein the hose coupling device is constructed of metal.

6. A method according to claim 1, wherein each of said clamp segments of at least one clamp has a first end having a first fastener bore therein and a second end having a second fastener bore therein, and wherein said clamp further comprises at least one fastener, each of said fasteners having a portion disposed in one of said first fastener bores and a threaded second portion for meshingly engaging said corresponding threads in one of said second fastener bores for releasably joining said clamp segments in an end-to-end configuration, and wherein said placing step is performed by threading each of said fasteners into one of said second fastener bores.

7. A method according to claim 1, wherein at least one clamp comprises three of said clamp segments and three of said fasteners.

8. A method according to claim 1, wherein each of said clamp segments of at least one clamp is generally arcuate, and wherein each of said clamp segments is generally rectangular in cross-section with chamfered top edges.

9. A method according to claim 1, wherein each of said clamp segments of at least one clamp comprises aluminum.

* * * * *